June 30, 1953 P. H. ALLEN ET AL 2,643,822

OPTICAL SUMMATION AND DECIMAL STRUCTURE

Filed April 24, 1946 2 Sheets-Sheet 1

INVENTORS

BY Philip H. Allen

Benjamin J. Chromy

INVENTORS

BY Philip H. Allen
Benjamin J. Chromy

Patented June 30, 1953

2,643,822

UNITED STATES PATENT OFFICE 2,643,822

OPTICAL SUMMATION AND DECIMAL STRUCTURE

Philip H. Allen, Orinda, Calif., and Benjamin J. Chromy, Washington, D. C.

Application April 24, 1946, Serial No. 664,476

25 Claims. (Cl. 235—63)

This invention relates to registers such as adding machines, accounting machines and calculating machines and is concerned more particularly with the provision of an improved automatic decimal mechanism for use in performing multiplying and dividing operations.

It is a general object of the invention to provide an improved decimal mechanism for registers.

Another object of the invention is to provide an optical decimal system operative between three registers or mechanisms capable of being set to differential values so that the setting of the decimal point in two factors of a multiplying or dividing operation will result in automatic correct placement and display of the decimal point in the third factor.

A further object of the invention is to provide a decimal system in which an illuminated decimal point is provided.

Another object of the invention is to provide an optical system for adding or subtracting values.

Other objects and advantages of the invention will be apparent from the following description of a preferred embodiment of the invention as illustrated in the accompanying drawings, in which.

Figure 1:
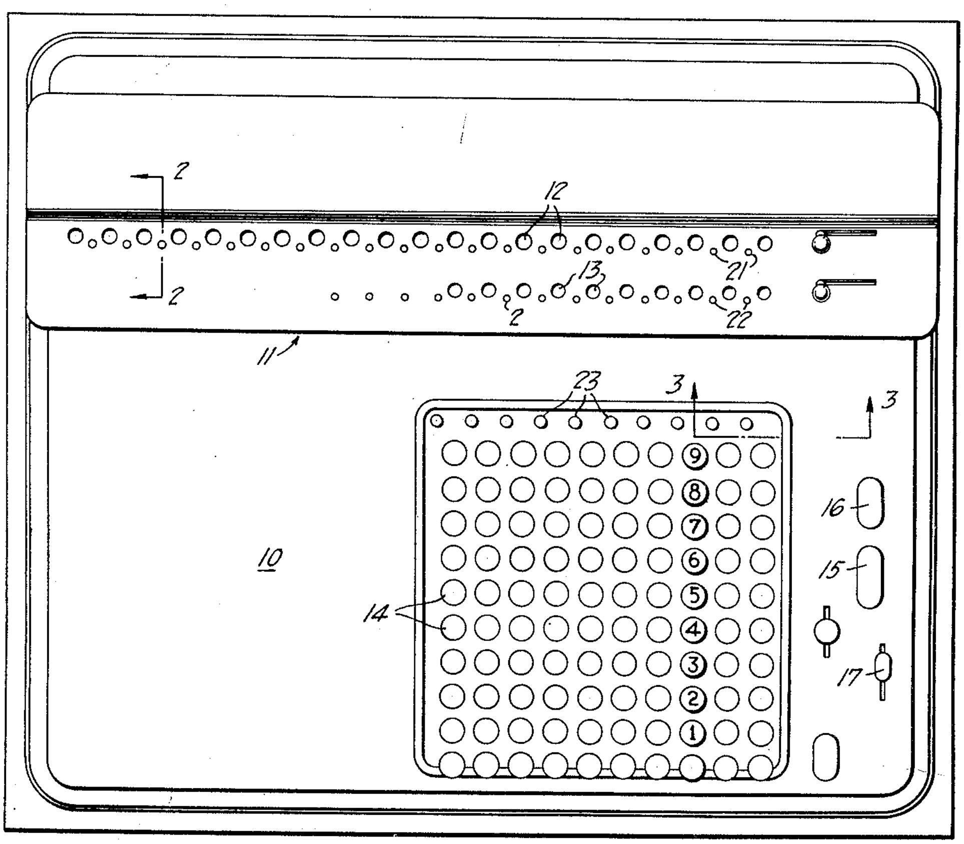
Figure 1 is a plan view of a calculating machine embodying the invention.

Referring to Figure 1 there is illustrated a calculating machine of the general type disclosed in the patent to Carl M. Friden, No. 2,229,889, dated January 28, 1941. The machine includes a body 10 in which the selecting and actuating mechanisms are housed and a shiftable register carriage 11 in which the accumulator 12 and the revolutions counter 13 are mounted. The body 10 includes the keyboard 14 and various operating controls including a plus bar 15, a minus bar 16, a divisional lever 17, etc.

The decimal mechanism includes a series of decimal indicators 21 between each pair of numeral wheels or dials of the accumulator, a series of indicators 22 between the corresponding dials of the revolutions counter and a series of indicators 23 between the adjacent orders of the keyboard 14. The series of decimal indicators 22 are extended to the left of the actual number of orders of the counting dials to increase the capacity of the machine in indicating decimals in quotients or in entering the decimal point in multiplier values. The decimal capacity may be increased to any desired extent as will appear more clearly hereinafter.

In general, the respective series of decimal indicators or keys 21, 22 and 23 have associated therewith an optical system which, when adjusted by keys of two of the series, will display the correct decimal point in the third series of decimal indicators. For example, in dividing operations by setting the proper decimal point of the dividend by means of a key 21 and of the divisor by a key 23, the series of indicators 22 will indicate in the appropriate order the correct decimal place for the quotient. Correspondingly, by appropriate setting of one each of the series of keys 22 and 23 in multiplying operations, one of the series of indicators 21 will designate the appropriate decimal point in the product. The optical system includes differentially settable reflecting elements under control of a series of keys which serve to add or subtract, as the case may be, the respective settings of the series to obtain the proper decimal point in the result. With the above general description of the system in mind, the parts will be described in detail.

The decimal indicators 21 and 22 (Figure 2) are similar and each indicator comprises a key stem 31 including a cylindrical flanged holder 32 and a key button 33 disposed therein of a suitable light transmitting plastic, such as methyl methacrylate. The button 33 is formed of a generally L-shaped rod and has its lowermost end facing a mirror or reflecting element 34 disposed at 45° thereto and carried by an arm 38 of the key stem. The key stem 31 is normally held in raised position by a spring 36 and is latched in depressed position by means of a latch slide 37 of conventional form which may be released by full or partial depression of another key of the series as in the usual type of so-called "flexible" keyboards.

Figure 4:
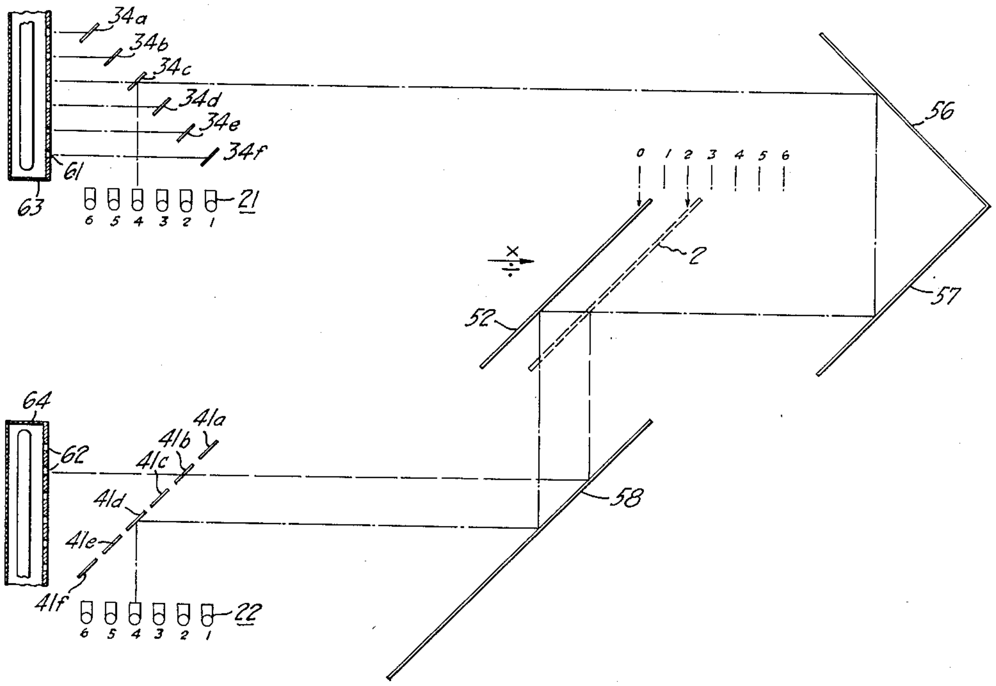
Figure 4 is a schematic plan view of an optical decimal system.

The arm 38 (Figure 2) which carries the reflecting element 34 also carries a shutter element 39 and these series of keys 21 and their arms 38, together with the mirrors 34 and the shutters 39, are generally arranged as indicated by the arrangement of the mirrors 34a through 34f in Figure 4, while the arrangement of the keys 22 and their associated mirrors are shown at 41a through 41f in Figure 4.

Figures 2, 3:
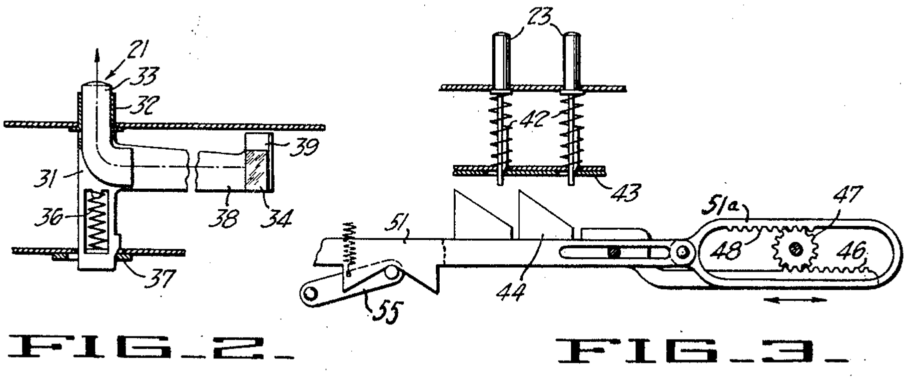
Figure 2 is a fragmentary sectional view taken as indicated by the line 2—2 in Figure 1.
Figure 3 is a fragmentary sectional view taken as indicated by the line 3—3 in Figure 1.

The decimal keys 23 for the keyboard 14 are illustrated in Figure 3, these keys being spring-urged upwardly by the spring 42 and having a latch slide 43 associated with the entire series of keys. Also associated with the keys 23 is a spring-urged differentially adjustable slide 44 adapted to be adjusted thereby. The slide 44 carries a rack 46 which meshes with a gear 47 mounted upon a suitable frame piece (not shown) of the machine. The gear 47 meshes with a rack 48 on the pivoted end portion 51a of a slide 51 which is suitably connected to a reflecting element or mirror 52 (Figure 4).

It will be seen therefore that the reflecting element 52 and its operating slide 51 can be differentially adjusted from a central or home position to which they are resiliently urged by a suitable type of spring-urged centralizing mechanism 55 associated with the slide 51. The adjustment is such that the rack slide 51 will be moved to the right in Figure 3.

As previously explained, the series of mirrors 34a through 34f in Figure 4 illustrates a portion of the entire series of decimal controls 21. As illustrated in Figure 4 the spacing of these elements as well as their size has been enlarged for purposes of clarity. In multiplying operations where the series of indicators 21 are utilized in displaying a decimal point, one of the reflecting elements 34a through 34f is adapted to receive a light ray and transmit it to the associated key to illuminate this key as the decimal point. When in dividing operations a setting of decimal point is required in the register 12, the depressed decimal key 21 operates to enable a light ray corresponding to this decimal setting by removing its shutter 39 from the path of the light ray. The series of mirrors 41a through 41f associated with the keys 22 operate similarly in either setting or receiving decimal indications as explained above in connection with the mirrors 34a through 34f.

As previously explained, the respective series of mirrors 34a through 34f and 41a through 41f also form shutters for a corresponding number of light beams provided by apertures 61 and 62 in respective enclosed light sources 63 and 64 for establishing the decimal indicating light ray in either division or multiplication, respectively.

Associated with the series of mirrors 34a to 34f and 41a to 41f and with the differentially adjustable reflecting element or mirror 52 is a system of stationary reflecting elements 56 through 58 (Figure 4), the mirrors 56 and 58 being disposed at right angles to each other with the mirror 56 in the path and at 45° to the paths of the light rays from the source 63, while the mirror 57 is parallel to the mirror 52. The third mirror 58 is parallel to the mirror 52 and is disposed to receive light rays therefrom and also to receive light rays from the source 64 under control of the decimal indicators 22. Thus, the stationary or nonadjustable system of mirrors operates in conjunction with the selectively operable sets of light sources and the differential settable mirror 52 to form a system for adding or substracting the differential settings of two of the elements and for transmitting the result to the third element of the system. It will be noted that the operation of the optical system is independent of ordinal shifting movement of the parts.

The arrangement shown in Figure 4 illustrates schematically a suitable system for use with either a shiftable or non-shiftable register carriage.

Assuming a problem is to be performed in multiplication, the multiplicand is set in the keyboard 14 and the appropriate decimal key 23 is depressed to position the mirror 52 to the right from its zero position shown in Figure 4, to the dotted line position indicated at "2," i. e. the second key 23 from the right has been depressed. The machine is then operated to perform the multiplication, the multiplier figure appearing in the revolutions counter 13 and the appropriate decimal point key 22 is depressed, for example, the key "2" so that the mirror 41b is lowered to pass the light ray from the second aperture 62 from the top in Figure 4.

This ray impinges upon the mirror 58 and is reflected to the mirror 52 and thence to the mirrors 57 and 56 so that it impinges upon the mirror 34c and is reflected to the light-transmitting display point of the aligned key 21 indicating the setting off four decimal places in the product. It will be noted that the effect of the relative shifting of the register carriage is cancelled by the mirror arrangement and has no bearing on the placing of the decimal point as this is controlled by the selected point of entry of the multiplier figure into the revolutions counter.

In performing division operations the dividend is set into the register 12 the appropriate decimal key 21 is depressed to transmit a light ray, the divisor is set into the keyboard 14 and the appropriate decimal key 23 is depressed so that both the dividend and divisor decimal points have been adjusted. It will be apparent that if the decimal point in the dividend is shifted to the left, the decimal point in the quotient is shifted to the left also, if the decimal point in the divisor is shifted to the left, the decimal point in the quotient is shifted to the right. Thus, there is in effect, an addition or subtraction of the decimal values set in the dividend with respect to the decimal value of the divisor carried out in obtaining the quotient decimal point. In division, the light ray passed by the depressed dividend decimal key 21 will be transmitted by the mirrors 56, 57, 52 and 58 to the appropriate one of the series of mirrors 41a through 41f, etc.

It will be appreciated that the schematic showing of the optical arrangement in Figure 4 for obtaining decimal points in multiplying and division operations is shown in connection with six orders of the accumulator 12 and six orders of the revolutions counter 13 whereas in a full capacity machine, an appropriate number of places would be provided in accordance with the desired capacity of the machine for decimal point indication. In adjusting the parts of the optical system the initial position of the mirror 52 is so selected with respect to the mirror systems of the decimal indicators 21 and 22 that with no decimal set in either the keyboard series of decimal indicators 23 or in the revolutions counter series 22 there will be no decimal indication in the product. Also, for division operations the adjustment is such that when a decimal is set in the dividend series of decimal indicators 21, a correspondingly numbered decimal indicator 22 of the quotient series will be illuminated if there has been no adjustment of the keyboard decimal mechanism. Operation of the keyboard or divisor decimal mechanism will then serve to add decimal points from the setting in the revolutions counter or quotient register.

In calculating machines employing shiftable register carriages, for example, the type disclosed in the above identified Friden patent, the use of light sources, such as shown at 63 and 64, in the carriage would require the use of some expedient such as an extensible electrical cord connection from the body of the machine to these light sources. In order to obviate the necessity for this type of connection between the body of the machine and the carriage, in accordance with the instant invention it is proposed to transmit a beam of light in the form of a band from the body of the machine to the shiftable carriage to serve as the source of light rays for use in conjunction with a series of decimal indicators, and one or more beams or bands of light can be transmitted in accordance with the number of registers which are mounted in the carriage.

Figure 5:
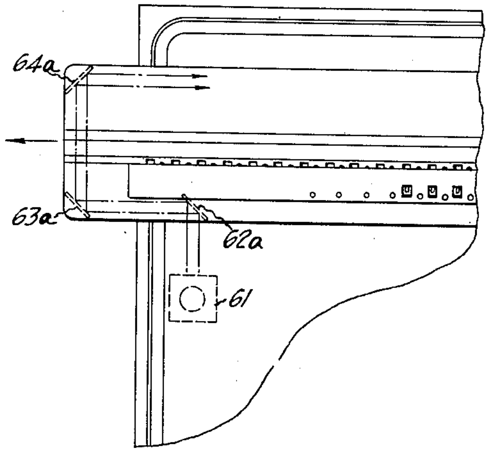
Figure 5 is a fragmentary plan view of the invention illustrating a light source arrangement with respect to the shiftable register carriage of a calculating machine.

Figure 5 illustrates a light source arrangement of the character referred to above in which a beam or band of light is transmitted from a light source 61 in the body of the machine to provide an effective source of light on the shiftable carriage. This is effected through an optical system including a reflecting element or mirror 62*a* on the frame which receives the band of light from the source 61 and reflects it at right angles to a parallel reflecting element or mirror 63*a* on the shiftable register carriage 11. From the reflecting element 63*a* the band of light is transmitted to a second direction-changing reflecting element 64*a* which directs the band of light longitudinally of the register carriage as desired for use in conjunction with a series of decimal indicators as explained in the preceding description. Thus, in any shifted position of the carriage an effective source of light may be provided for one or more optical decimal systems without a mechanical or electrical connection between the body of the machine and the shiftable register carriage.

While we have shown certain preferred embodiments of the invention, it will be apparent that the invention is capable of further variation and modification and its scope should be limited only by the scope of the claims attached hereto.

We claim:

1. In a calculating machine including a shiftable register carriage having a register therein and a body containing a source of light for producing a light ray, a selection mechanism for effecting entry of values in said register, an optical system for indicating the decimal point of a result in said register including differential optical elements on said body and optical elements on said carriage, and means for transmitting said light ray from the optical elements on the carriage to the optical elements on the body and vice versa during shifting of said carriage without changing the direction of and without shifting the path of the light ray.

2. In a calculating machine including a shiftable register carriage having a register therein and a body containing a source of light for producing a light ray, a selection mechanism for effecting entry of values in said register, and an optical system for indicating the decimal point of a result in said register including optical elements on said body and optical elements on said carriage, an element on said carriage and an element on said body being disposed to transmit said light ray therebetween parallel to the direction of shifting movement of said carriage.

3. In a calculating machine having a shiftable register carriage, optical means on said carriage, a source of light in the body of the machine, and means including a pair of opposed light reflecting elements for transmitting a ray of light from said source of light to said optical means in any position of said carriage, one of said elements being mounted on said carriage for movement therewith and the other of said elements being positioned on said body to receive the ray of light from said source and to reflect it to said one element along a path parallel to the path of movement of the carriage.

4. In a calculating machine, three respective ordinal series of value indicating devices including a keyboard and two registers, settable means associated with each of said series for indicating the decimal point of a value therein, selectively settable optical structure associated with the settable means of one of said registers for transmitting a light ray as a signal of the decimal value, selectively settable optical structure associated with the settable means of the keyboard for receiving the light ray from said first-named optical structure and for varying its path in accordance with the decimal value of the keyboard factor, and optical means associated with the other register for receiving the light ray from said second-named optical structure and responsive to the light ray for providing an indication of the decimal point of the value standing in said second register.

5. In a calculating machine, two registers, each register including an ordinal series of value indicating devices, an ordinal series of decimal indicators for each series of said devices including an ordinal series of optical elements arranged in sequentially offset relation with respect to each series of said indicators and controlled respectively by said indicators to establish a light ray corresponding to the position of a decimal point in said series of devices and to control the point of entry of a light ray from the similar series of elements of the other register, a light source for each series of said elements, and an optical system for controlling the transmission of decimal indicating light rays between the registers.

6. In a calculating machine, two registers, each register including an ordinal series of value indicating devices, an ordinal series of decimal indicators for each series of said devices including an ordinal series of optical elements and controlled respectively by said indicators to establish a light ray corresponding to the position of a decimal point in said series of devices and to control the point of entry of a light ray from the similar series of elements of the other register, a light source for each series of said elements, and an optical system for controlling the transmission of decimal indicating light rays between the registers.

7. In a calculating machine, two registers, each register including an ordinal series of value indicating devices, an ordinal series of decimal indicators for each series of said devices including an ordinal series of optical elements arranged in sequentially offset relation with respect to each series of said indicators and controlled respectively by said indicators to establish a light ray corresponding to the position of a decimal point in said series of devices and to control the point of entry of a light ray from the similar series of elements of the other register, a light source for each series of said elements, an optical system for controlling the transmission of decimal indicating light rays between the registers including a differentially settable key-controlled optical member, and keyboard means for setting said member.

8. In a calculating machine, two registers, each register including an ordinal series of value indicating devices arranged in a row, an ordinal series of light-responsive decimal indicators in said row, a light source disposed at right angles to said row and including structure forming a plurality of parallel light rays directed parallel to said row, an ordinal series of shutters arranged at an angle to said row and to said light source, each shutter being aligned to intercept a light ray and being controlled by one of said indicators for movement out of the path of the aligned light ray, an ordinal series of light reflecting elements arranged at said angle and disposed to intercept a light ray from the other register and to reflect the light ray to impinge upon the aligned decimal indicator; and an optical system including a light reflecting element for each register disposed to intercept any light ray from the light source of the associated register and to re-direct said light ray, a differentially settable reflecting element operatively disposed with respect to both of said reflecting elements so that a light ray originated from either of said registers is re-directed to the other of said registers, and key control means for said adjustable reflecting element.

9. In a calculating machine, an ordinal series of value indicating devices, and an ordinal series of light-responsive decimal indicators for said devices including an ordinal series of light-reflecting elements arranged in sequentially offset relation with respect to said indicators to control the selective impingement thereon of a light ray corresponding to the position of a decimal point in said series of devices.

10. In a calculating machine, an ordinal series of value indicating devices, an ordinal series of decimal indicators for said devices including an ordinal series of optical elements arranged in sequentially offset relation with respect to said indicators to control the selective establishing of a light ray corresponding to the position of a decimal point in said series of devices, and a light source for said elements.

11. In a calculating machine, an ordinal series of value indicating devices arranged in a row, an ordinal series of decimal indicators in said row, a light source disposed at right angles to said row and including structure forming a plurality of parallel light rays directed parallel to said row, and an ordinal series of shutters controlled respectively by said indicators and arranged at an angle to said row and to said light source, each shutter being aligned to intercept a light ray and being controlled by the associated one of said indicators for movement out of the path of the light ray.

12. In a calculating machine, an ordinal series of value indicating devices arranged in a row, an ordinal series of decimal indicators in said row, a light source including structure forming a plurality of parallel light rays, and an ordinal series of shutters controlled respectively by said indicators, each shutter being aligned to intercept a light ray and being controlled by the associated one of said indicators for movement out of the path of the light ray.

13. In a calculating machine, a source of light for producing a light ray, an ordinal series of value indicating devices, and an ordinal series of light responsive decimal indicators for said devices including ordinal light controlling structure arranged in differential relation with respect to said indicators to control the selective impingement thereon of said light ray corresponding to the position of a decimal point in said series of devices.

14. In a calculating machine, a source of light for producing a light ray, an ordinal series of value indicating devices, and an ordinal series of light responsive decimal indicators for said devices including selectively settable optical structure disposed with respect to said indicators to control the selective impingement thereon of said light ray corresponding to the position of a decimal point in said series of devices.

15. In a calculating machine, a source of light for producing a light ray, an ordinal series of value indicating devices, an ordinal series of decimal indicators for said devices including ordinal light controlling structure arranged in differential relation with respect to said indicators to control the selecting establishing of said light ray corresponding to the position of a decimal point in said series of devices.

16. In a calculating machine, a source of light for producing a light ray, an ordinal series of value indicating devices, an ordinal series of decimal indicators for said devices including selectively settable optical structure disposed with respect to said indicators to control the selective establishing of said light ray corresponding to the position of a decimal point in said series of devices.

17. In a calculating machine, an ordinal series of value indicating devices arranged in a row, an ordinal series of decimal indicators in said row, a light source, and ordinal optical structure controlled by said indicators for selectively establishing a light ray from said light source for representing the active decimal indicator of said ordinal series.

18. In a registering device, a light source, means for characterizing a light ray from said source to represent one of a series of successive integers, settable means for incrementally shifting the path of said light ray in accordance with a second integer, and optical means responsive to said light ray for displaying an indication that is representative of the sum of the respective integers.

19. In a registering device, a light source, means for characterizing a light ray from said source to represent one of a series of successive integers, settable means for incrementally shifting the path of said light ray in accordance with a second integer, and optical means responsive to said light ray for displaying an indication that is representative of the difference of the respective integers.

20. In a registering device, a light source, means for characterizing a light ray from said source to represent one of a series of successive integers, settable means for incrementally shifting the path of said light ray in accordance with a second integer, and optical means responsive to said light ray including a display element formed of a light-transmitting plastic.

21. In a calculating machine, optical structure for producing a light ray in any one of a series of incrementally spaced paths to represent a selected one of a series of integers, settable optical means for incrementally controlling said light ray in accordance with a selected one of a second series of integers, and light responsive means positioned for impingement by said ray to provide an indication of the sum of any two selected integers of said respective series.

22. In a calculating machine, structure for producing a ray of radiant energy in any one of a series of incrementally spaced paths to represent a selected one of a series of integers, settable means for incrementally controlling said ray in accordance with a selected one of a second series of integers, and radiant energy responsive means positioned for impingement by said ray to provide an indication of the sum of any two selected integers of said respective series.

23. In a registering device, light source means for producing a linear array of light rays incrementally spaced apart, settable means for characterizing said rays so that each ray represents an integer of a series, a second settable means for shifting by increments the path of any characterized light ray in accordance with a second integer, and means responsive to any of said light rays for providing an indication representative of the sum of the integers.

24. In a registering device, light source means for producing an array of light rays incrementally spaced apart, settable means for characterizing said rays so that each ray represents an integer of a series, a second settable means for shifting by increments the path of any characterized light ray in accordance with a second integer, and means responsive to any of said light rays for providing an indication representative of the sum of the integers.

25. In a calculating machine, a register including an ordinal series of light responsive devices, each light including an ordinal series of light responsive devices, each light responsive device being capable of representing an integral value of a series of such values, light source means for producing a light ray, means for characterizing said ray to represent an integer of a series, and settable means for shifting by increments the path of said light ray in accordance with a second integer and for directing said light ray to impinge upon one of said ordinal series of light responsive devices.

PHILIP H. ALLEN.
BENJAMIN J. CHROMY.

References Cited in the file of this patent

UNITED STATES PATENTS

| Number | Name | Date |
|---|---|---|
| 1,503,742 | Bacon | Aug. 5, 1924 |
| 1,799,037 | Bley | Mar. 31, 1931 |
| 1,901,876 | Lehde | Mar. 21, 1933 |
| 1,943,229 | Petschenig | Jan. 9, 1934 |
| 2,143,011 | De Juhasz | Jan. 10, 1939 |
| 2,168,886 | Roberts | Aug. 8, 1939 |
| 2,221,063 | Teague et al. | Nov. 12, 1940 |
| 2,240,028 | Bader | Apr. 29, 1941 |
| 2,288,520 | Geller | June 30, 1942 |
| 2,322,602 | Terry | June 22, 1943 |
| 2,329,218 | Reynolds | Sept. 14, 1943 |
| 2,410,550 | Padva | Nov. 5, 1946 |
| 2,476,257 | Hoff | July 12, 1949 |
| 2,492,345 | Allen | July 12, 1949 |
| 2,497,042 | Doll | Feeb. 7, 1950 |